United States Patent [19]

Yamazaki

[11] Patent Number: 4,943,872
[45] Date of Patent: Jul. 24, 1990

[54] SYSTEM OF FAST REPRODUCTION AT NON-INTEGRAL MULTIPLE OF NORMAL PLAYBACK SPEED

[75] Inventor: Shohei Yamazaki, Hamamatsu, Japan

[73] Assignee: Yamaha Corporation, Hamamatsu, Japan

[21] Appl. No.: 396,736

[22] Filed: Aug. 18, 1989

Related U.S. Application Data

[63] Continuation of Ser. No. 151,257, Feb. 1, 1988, abandoned.

[30] Foreign Application Priority Data

Feb. 4, 1987 [JP] Japan .................................. 62-24273

[51] Int. Cl.⁵ ............................ G11B 5/00; G11B 5/09
[52] U.S. Cl. ........................................... 360/8; 360/32
[58] Field of Search ...................... 360/8, 10.1, 32, 48, 360/73.05, 73.09; 358/312

[56] References Cited

U.S. PATENT DOCUMENTS

| | | | |
|---|---|---|---|
| 4,307,417 | 12/1981 | Tokuyama | 360/10.1 |
| 4,494,153 | 1/1985 | Ravizza | 358/312 |
| 4,558,376 | 12/1985 | Heitmann | 360/10.1 |
| 4,611,252 | 9/1986 | Igata et al. | 360/73.05 |
| 4,644,415 | 2/1987 | Serizawa et al. | 358/312 |
| 4,686,584 | 8/1987 | Kojima et al. | 358/312 |
| 4,688,116 | 8/1987 | Takahashi et al. | 360/32 |
| 4,731,659 | 3/1988 | Kani | 360/10.1 |
| 4,771,345 | 9/1988 | Watanabe | 360/8 |
| 4,812,924 | 3/1989 | Fukami et al. | 360/48 |

*Primary Examiner*—Vincent P. Canney
*Attorney, Agent, or Firm*—Spensley Horn Jubas & Lubitz

[57] ABSTRACT

A magnetic recording and reproducing device comprises a rotary head incorporating plural heads having different azimuths and recording and reproducing an input signal by tracing a magnetic tape and a tape feeding drive device for feeding the magnetic tape. The tape feeding drive device feeds the magnetic tape during multiple speed reproduction with a tape feeding speed of about $(N+\frac{1}{2})$ times (where N is an integer) as high as a tape feeding speed during a normal speed reproduction. Positional relation of head trace to the track thereby is shifted by $\frac{1}{2}$ track in each trace with a result that a section in which information such as sub-code can be read and a section in which it cannot be read are dispersed on time axis. This enables the information to be obtained substantially in real time.

4 Claims, 12 Drawing Sheets

SYSTEM OF FAST REPRODUCTION AT NON-INTEGRAL MULTIPLE OF NORMAL PLAYBACK SPEED

This is a continuation of copending application Ser. No. 151,257 filed on Feb. 1, 1988, now abandoned.

BACKGROUND OF THE INVENTION

This invention relates to a magnetic recording and reproducing device such as an R-DAT (rotary head type digital audio tape recorder) which performs recording and reproduction with a rotary head having plural heads of different azimuths and, more particularly, to a magnetic recording and reproducing device capable of reading information recorded in the form of a control such as a sub-code representing a musical piece, position or time or the like in a stable manner without dropping of such information over a long period of time during multiple speed or high speed reproduction in which reproduction is made by fast feeding or fast rewinding the tape.

The R-DAT is a device which converts analog signals such as an audio signal into PCM signals, records the PCM signals on a magnetic tape and reproduces the same.

As shown in FIG. 2, the device comprises a rotary head 2 having two magnetic heads A and B separated by 180 degree interval on the circumferential surface of a cylinder 1. A tape 3 is loaded from a cassette housing 4 with a vertical post 5 or with an inclined post 6, wound on the circumferential surface of the rotary head 2 for 90 degrees, supported by a fixed guide 7, and run by a capstan 8 and a pinch roller 9.

The diameter of the rotary head 2 is 30 mm, and the winding angle for the tape is 90 degrees. For recording and reproduction, at the mode I which is usually used, the speed of the rotary head 2 is 2,000 rpm (circumferential speed: 3.14 m/sec) and the speed of the tape 3 is 8.15 mm/sec in the direction identical to that of the rotary head 2. The relative speed of the head 2 as against the tape 3 is 3.13 m/sec.

The recording system with R-DAT is a helical scanning azimuth recording. Its tape format as shown in FIG. 3 defines the track angle as 6° 22′ 59.5″ and azimuth angle as ± 20° with the tracks alternately traced by two heads A and B.

FIG. 4 shows a track format wherein audio data are recorded at the center of a PCM region, and sub-codes and control signals such as ATF (automatic track finding) are recorded on both sides thereof.

The PCM region comprises 128 blocks as shown in FIG. 5 each of which has recording regions for a block synchronizing (indicating the starting position of the block), ID (identification) code, block address, parity check code, and audio data. At the mode I, audio data uses 2's complement codes of quantization bit of 16 bits of the sampling frequency of 48 kHz, and the PCM data is divided into 8 bits in higher order and 8 bits of lower order, modulated from 8 bits into 10 bits (8–10 modulation) and recorded in 10 bits.

In the sub-code region, information such as the number of musical piece recorded and time an elapsed during reproduction of the musical piece is recorded. A format of the sub-code region (for one block) is shown in FIG. 6.

For tracking control during reproducing in the R-DAT, an automatic tracking system with ATF is employed. ATF system detects and compares crosstalks from two adjacent tracks by ATF signals (see FIG. 4) recorded on the tracks, and controls the speed of the capstan motor for running tape so as to make crosstalks identical.

By this arrangement, the head A traces a track of azimuth + 20° (hereinafter referred to as A track) whereas the head B traces a track of azimuth − 20° (hereinafter referred to as B track). These heads A and B can trace width which is about 1.5 times as wide as the width of each track.

An R-DAT can be provided with a function of multiple speed or high speed reproduction corresponding to fast feeding reproduction (CUE F. F.) and rewinding reproduction (CUE REVIEW) provided in an analog type tape recorder. In the description to follow, multiple speed or high speed reproduction in the fast feeding direction will be referred to as "forward multiple speed reproduction" and multiple speed reproduction in the rewinding direction as "reverse multiple speed reproduction"). This multiple speed reproduction can be obtained by fast feeding or rewinding the tape while the mode is in reproduction mode.

During multiple speed reproduction, the head is released from the tracking control and crosses the tracks obliquely. In this case, recorded signals are reproduced in portions where the head A has crossed the A track and the head B has crossed the B track. Parts of a musical piece thereby are reproduced and multiple speed reproduction is realized.

An R-DAT has a function of reproducing and displaying, during a normal reproduction mode, the number of musical piece and time in a reproduced music piece which are recorded in the sub-code region of the tape. If sub-code information corresponding to a reproduced position is displayed in real time during also multiple speed reproduction, it will be very convenient for operations such as search (e.g., in case that reproduction should be started from a position at a specific time in a specific musical piece). Although each head passes over the sub-code region of either track in each tracing even during multiple speed reproduction, the head A does not necessarily trace the sub-code region of the A track and the head B that of the B track since the heads are not under the ATF control. When the head A traces the sub-code region of the B track and the head B traces the sub-code region of the A track, no sub-code is obtained with a result that the sub-code can only be reproduced intermittently.

The speed of multiple speed reproduction in the conventional R-DAT is integer multiple of a normal speed of reproduction. This however often causes a state in which the sub-code is not reproduced for a long period of time with resulting failure in real time display of sub-code information.

FIGS. 7 and 8 respectively show head traces on the tape in forward multiple speed reproduction and reverse multiple speed reproduction in the case of five-fold speed which is an odd number multiple speed in the integer multiple speed reproduction. A1, A2 etc. show trace of the head A and B1, B2 etc. show trace of the head B. The order of tracing is A1, B1, A2, B2 and so on. In multiple speed reproduction, the head trace does not become parallel with the tracks but crosses the tracks obliquely. In this case, amount of deviation between start position of the tracing and end position thereof changes as shown in FIG. 9 depending upon the times of speed in the multiple speed reproduction.

In FIGS. 7 and 8, the shaded portions represent portions of tracks in which the head A is tracing the A track and the head B is tracing the B track. Since the head trace is not parallel with the tracks, the width of these portions also undergo changes. The narrower the width of the shaded portion, the greater is the deviation between the head and the track and the lower is the output level, of the head. According to efficiency of the currently available head, recorded information can be read if this width is greater than about three quarters of the width of the track.

In multiple speed reproduction at integer multiple speed, interval produced between head traces becomes integer multiple of one track, whether it is an odd number or even number, so that positional relation between the head trace and the track becomes substantially the same pattern for the respective head traces.

In the five-fold speed trace state shown in FIGS. 7 and 8, patterns of sections in which recorded information can be read and those of sections in which recorded information cannot be read become as shown in (a) and (b) in FIG. 10 in which phase relation between the respective traces is the same. In this case, positional relation is such that the head A traces the A track in the sub-code position on the track and the head B traces the B track in the sub-code position so that the sub-code can be read trace by trace.

In multiple speed reproduction, however, the heads are released from the tracking control by ATF as described above and the positional relation as shown in FIGS. 7 and 8 have been obtained only accidentally. The positional relation between the head trace and the tracks is gradually deviated due to subtle variation in the rotation of the tape running capstan motor and stretching of the tape and becomes states as shown in FIGS. 11 and 12. In these states, patterns of sections in which recorded information can be read and those in which recorded information cannot be read become as shown in (c) and (d) in FIG. 10 in which phase relation between the traces becomes equal and the sub-code cannot be read in any section. These states continue until the positional relation between the head traces and the track is restored to the states shown in FIGS. 7 and 8 due to the above described element of instability. Since finally read sub-code information is held and displayed during a period of time when sub-code information cannot be read, sub-code information which precedes by far an actually reproduced position is displayed with resulting failure in real time display of sub-code information. Further, it is understood that a state that a substantial amount of PCM audio data also is dropped occurs.

If an even number multiple speed, e.g., four-fold speed or six-fold speed, among integer multiple speed is used, a range in which sub-code information can be read is broader than in the above described odd number multiple speed so that it has a better reading condition. The head trace pattern however is the same for the respective tracks so that deviation is caused in the manner of reading of sub-code information, e.g., the first sub-code (SUB CODE1 in FIG. 4) of the A track only is read and the first sub-code of the B track is not read at all. The inconvenience that sub-code cannot be read arises also in cases where a trouble has occurred in either one of the heads A and B or where there is a scratch ranging over a relatively long section in the longitudinal direction of the tape in which the sub-code to be read is recorded.

Thus, in the prior art integer multiple speed reproduction, sub-code information can either be read continuously or cannot be read at all continuously and, accordingly, this is very inconvenient for performing operations such as search. Besides, there is also a case where PCM data is not reproduced for a long period of time depending upon the positional relation between the head trace and the track.

It is an object of the invention to provide a magnetic recording and reproducing device which has eliminated the above described disadvantages of the prior art device and can successfully prevent a state in which information such as the number of music piece, position and time cannot be read continues from occurring over long period of time during multiple speed reproduction.

SUMMARY OF THE INVENTION

For achieving the above described object of the invention, it is a feature of the invention to employ a tape feeding speed during multiple speed reproduction which is about $(N + \frac{1}{2})$ times (where N is an integer) as high as a tape feeding speed during a normal speed reproduction. The magnetic recording and reproducing device according to the invention comprises a rotary head incorporating plural heads having different azimuths and recording and reproducing an input signal by tracing a magnetic tape, and tape feeding drive means for driving feeding of the magnetic tape, the tape feeding drive means feeding said magnetic tape during multiple speed reproduction with a tape feeding speed of about $(N + \frac{1}{2})$ times (where N is an integer) as high as a tape feeding speed during a normal speed reproduction.

As described above, in the prior art integer multiple speed reproduction, the positional relation of the head trace to the track becomes substantially the same whereas, according to the invention, a fraction of $\frac{1}{2}$ is added to the integer multiple speed and this brings about the result that the positional relation of the head trace to the track is shifted by $\frac{1}{2}$ track in each trace so that the phase relation between a section in which recorded information can be read and a section in which recorded information cannot be read is shifted in each trace with a result that a state in which recorded information cannot be read does not last long but a section in which information such as sub-code can be read and a section in which it cannot be read are dispersed on time axis. This enables information such as sub-code to be obtained substantially in real time which in turn enables operations such as search to be performed without inconveniences and prevents a state in which data such as PCM data cannot be read from occurring over long period of time.

The degree of dispersion of the section in which information can be read and the section in which it cannot be read is at the largest when $\frac{1}{2}$ is added to integer multiple in the multiple speed. As the added fraction is deviated from $\frac{1}{2}$, the dispersed state becomes less uniform (i.e., duration of the section in which information can be read or that of the section in which information cannot be read become gradually longer) and the dispersed state becomes the worst when the added fraction is either $1/\infty$ or $1/1$ (i.e., integer multiple). Accordingly, the addition of $\frac{1}{2}$ is most preferable but addition of a fraction which is deviated to some extent from $\frac{1}{2}$ (e.g., in the order of $\frac{1}{4}$ through $\frac{3}{4}$) is practically permissible. The value of the fraction therefore may be determined in such a manner that duration of the section in which information cannot be read is restricted within a range which will not seriously hamper the object of multiple speed reproduction such as search.

BRIEF DESCRIPTION OF THE DRAWINGS

In the accompanying drawings.

DESCRIPTION OF PREFERRED EMBODIMENTS

An embodiment in which the invention has been applied to an R-DAT will be described. In the following description, it is assumed that heads A and B are so constructed that they can respectively trace a width of 1.5 times as large as the track width and they can correctly read a signal if they can trace more than three quarters of the width of each track.

Figure 13:
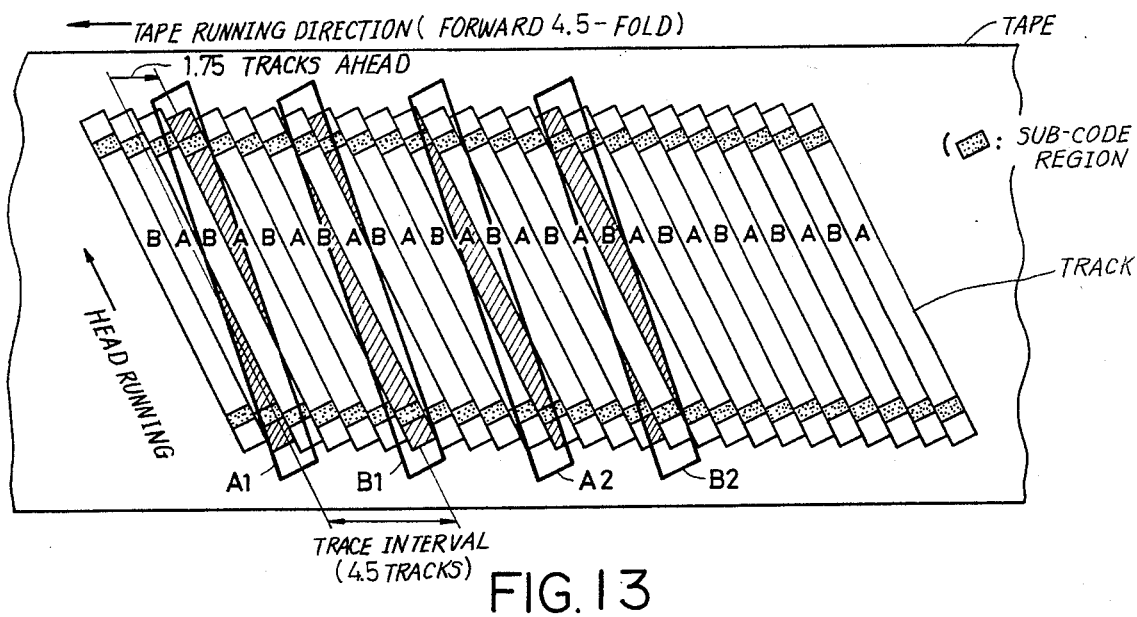
FIG. 13 is a diagram showing positional relation between the track and the head trace in forward 4.5-fold speed.

FIG. 13 shows positional relation between the tape track and the head trace in the case of forward 4.5-fold speed. A1, A2, etc. designate head trace of the head A whereas B1, B2, etc. designate head trace of the head B. The order of tracing is A1, B1, A2, B2 and so on. The shaded portions in the head trace represent portions in which the head A traces the A track and the head B traces the B track.

Figure 9:
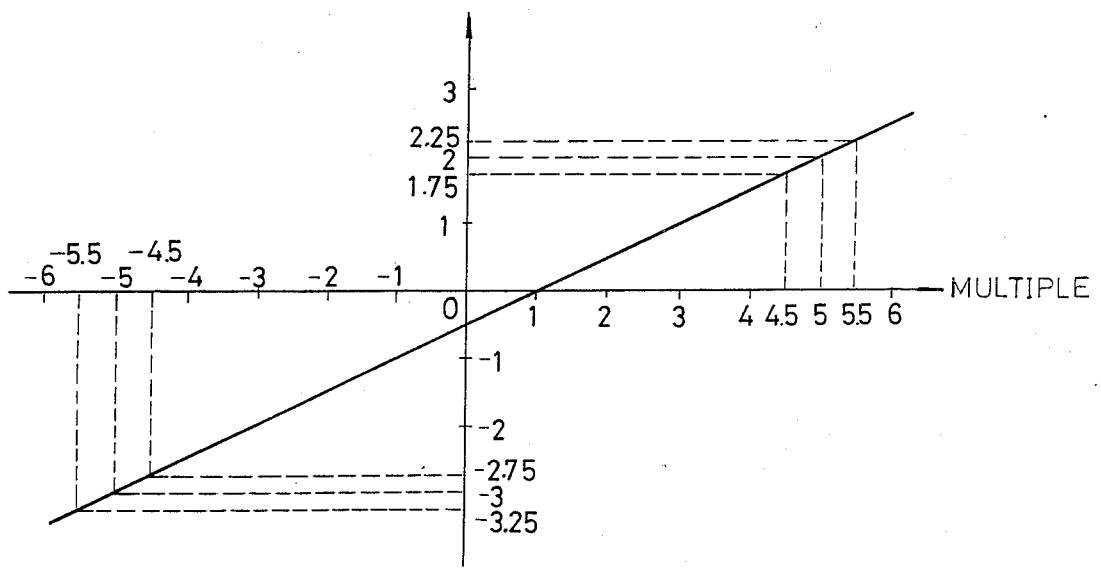
FIG. 9 is a diagram showing the amount of deviation between the track and the head trace in one trace in relation to multiple speed ratio.
Figure 7:
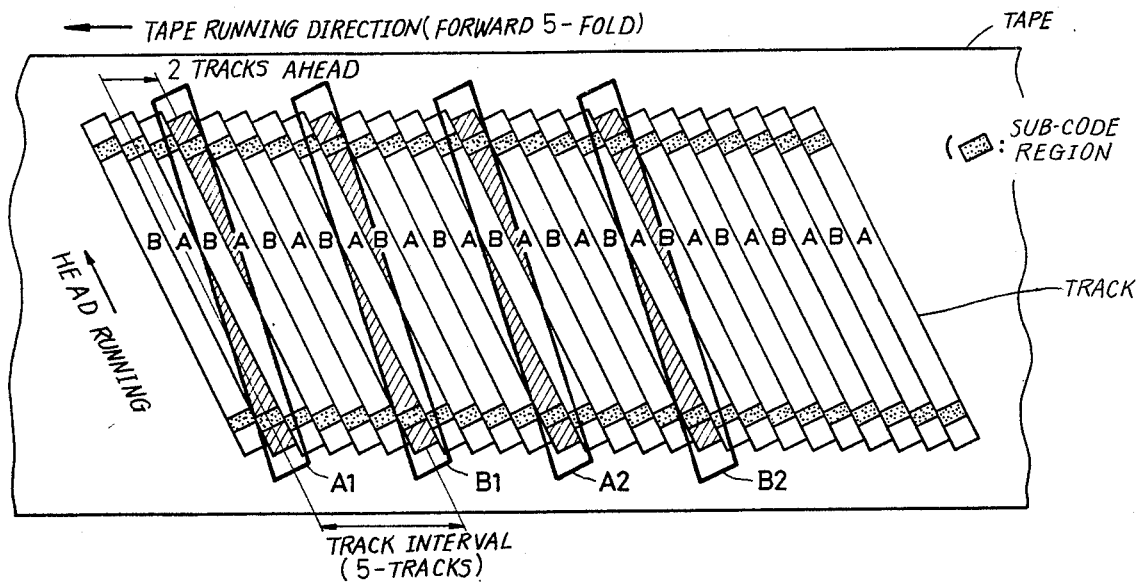
FIGS. 7 and 8 are diagrams showing positional relation between the track and head trace in case that sub-code can be read in forward five-fold speed and reverse five-fold speed.
Figure 8:
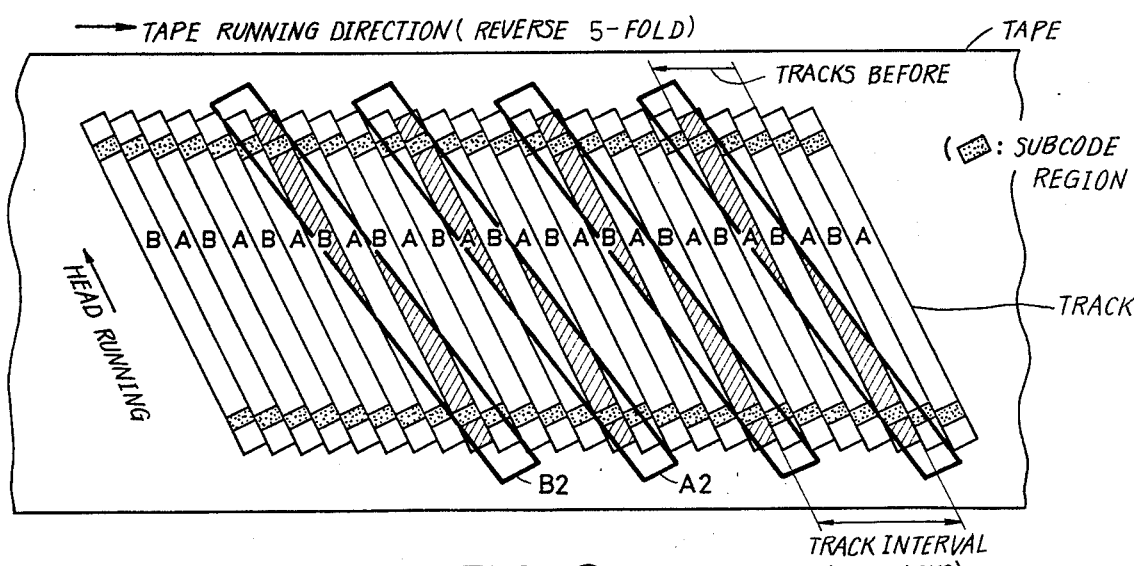
Figure 10:
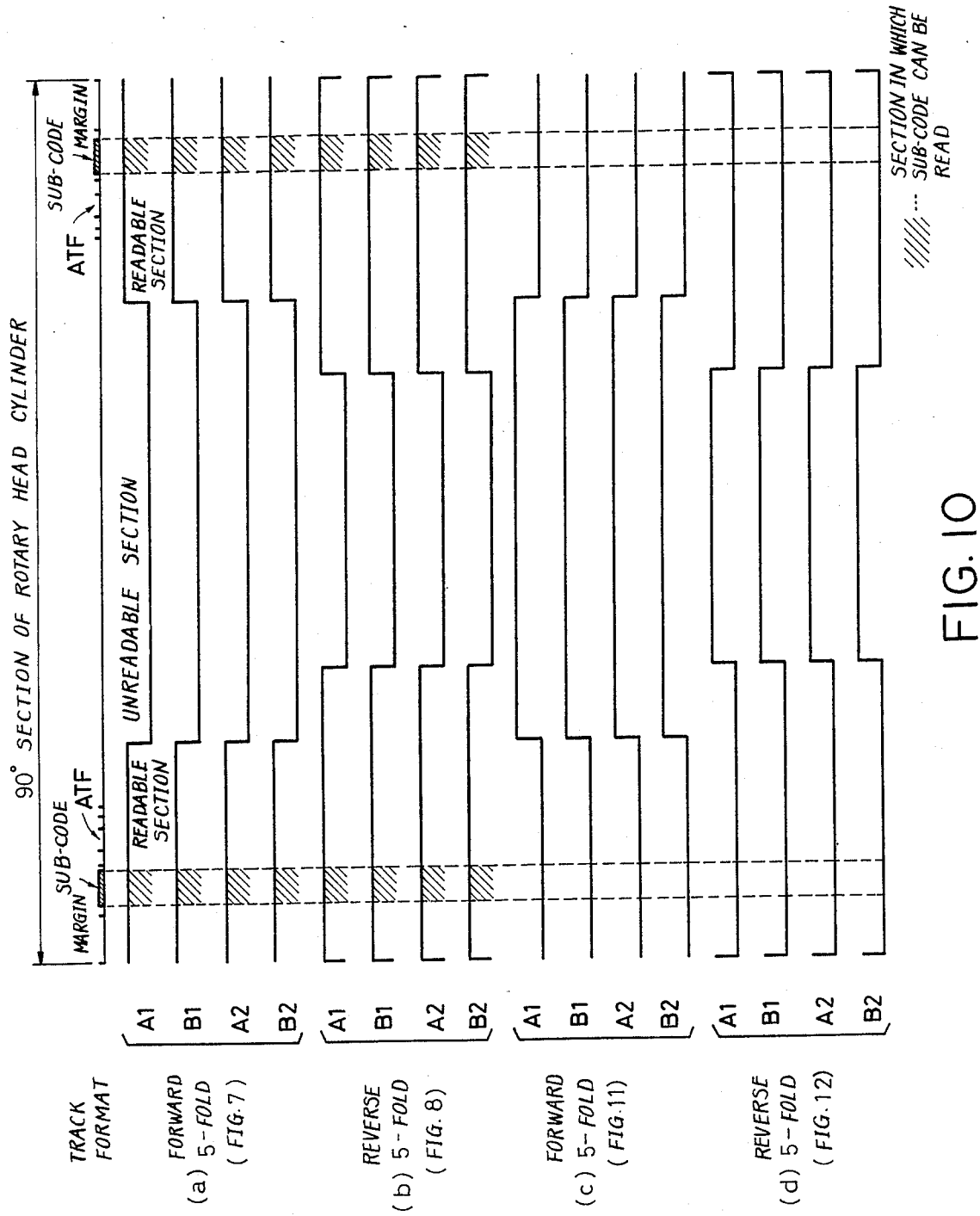
FIG. 10 is a diagram showing sections in which recorded information can be read and sections in which recorded information cannot be read in the states of FIGS. 7, 8, 11 and 12.
Figure 11:
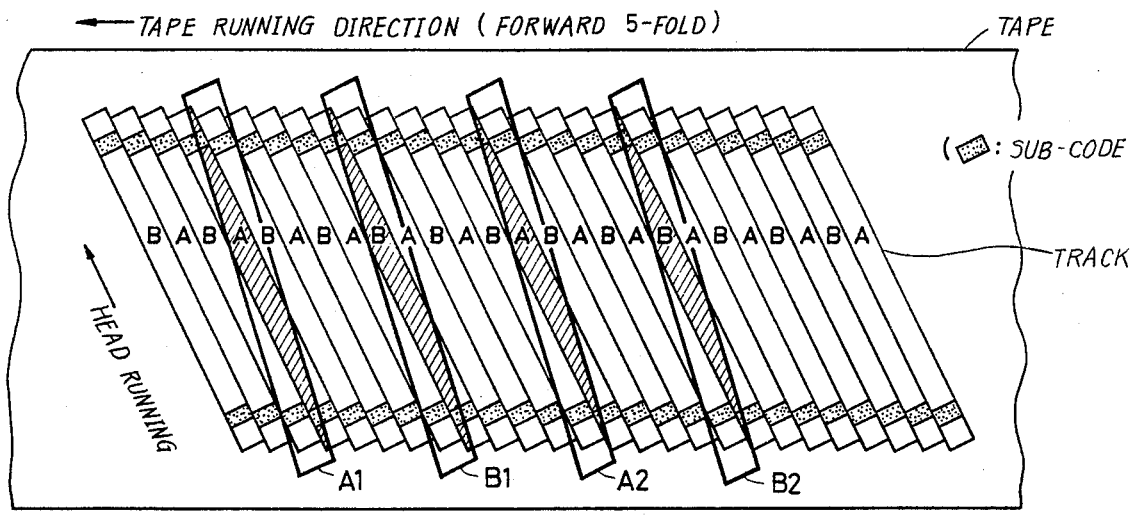
FIGS. 11 and 12 are diagrams showing positional relations between the track and the head trace in case that sub-code cannot be read in forward five-fold speed and reverse five-fold speed.
Figure 12:
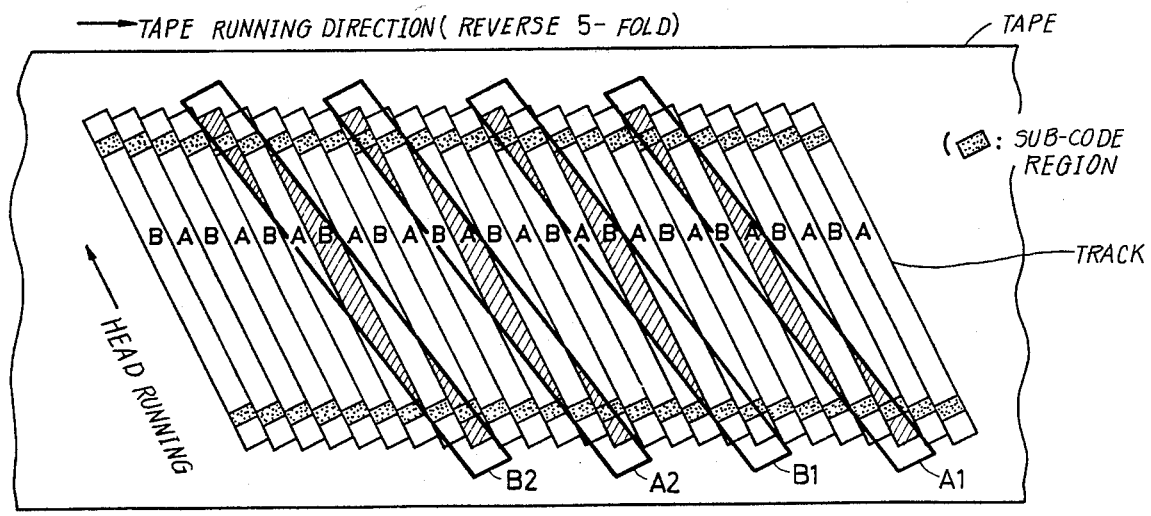

The head crosses the track and reaches a position 1.75 track ahead in one trace (see FIG. 9). The respective head traces with an interval of 4.5 tracks become parallel with each other.

The relative position of the head trace with respect to the track is deviated for each head trace due to the addition of the fraction of 0.5-fold and repeats the same pattern every four traces (since the A track and B track are repeated every two tracks, 2 tracks ÷ 0.5-fold = 4 traces).

Figure 14:
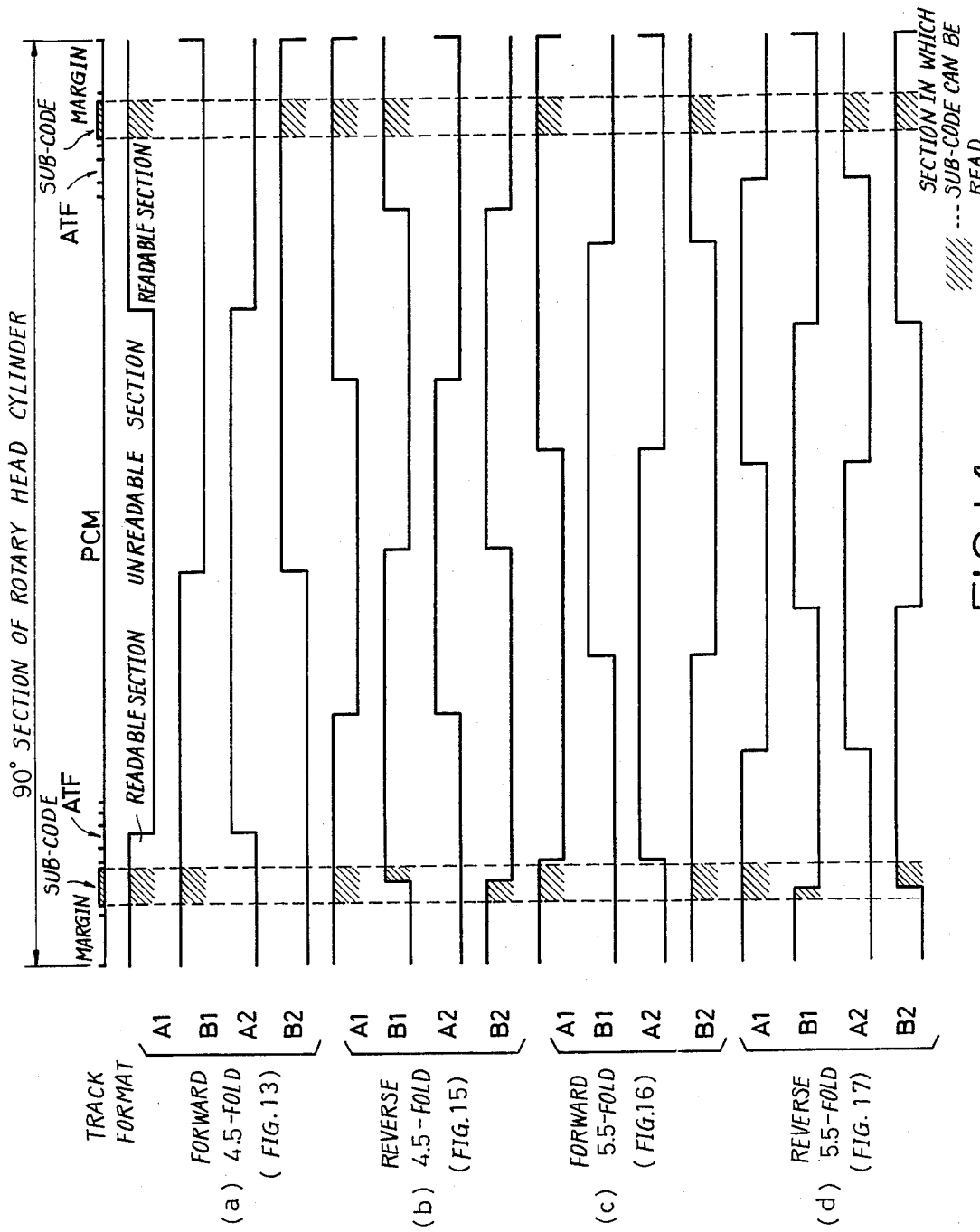
FIG. 14 is a diagram showing sections in which recorded information can be read and sections in which recorded information cannot be read in the states of FIG. 13 and FIGS. 15 through 17.

The change in phase of the sections in which recorded information can be read and the sections in which recorded information cannot be read in the case of FIG. 13 is shown in (a) of FIG. 14. According to this diagram, four among eight sub-code regions which are passed over by four traces can be substantially reproduced and a section in which sub-code cannot be read does not last more than two traces. A PCM reproduced signal can also be obtained without being dropped for a long period of time.

Figure 15:
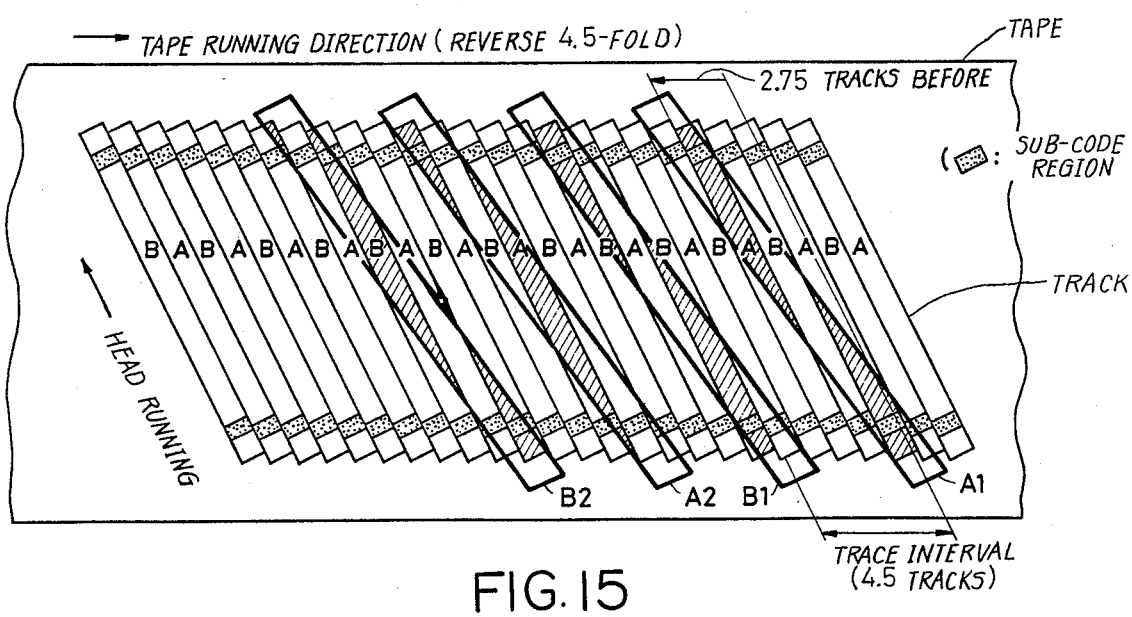
FIGS. 15 through 17 are diagrams showing respectively positional relations between the track and the head trace in reverse 4.5-fold speed, forward 5.5-fold speed and reverse 5.5-fold speed.

FIG. 15 shows a positional relation between the tape track and the head trace in the case of reverse 4.5-fold speed. The head crosses the track to return to a position 2.75 track before in one trace. The respective head traces with an interval of 4.5 tracks are parallel with each other. The change in phase of the section in which recorded information can be read and sections in which recorded information cannot be read in the case of FIG. 15 is shown in (b) of FIG. 14.

Figure 16:
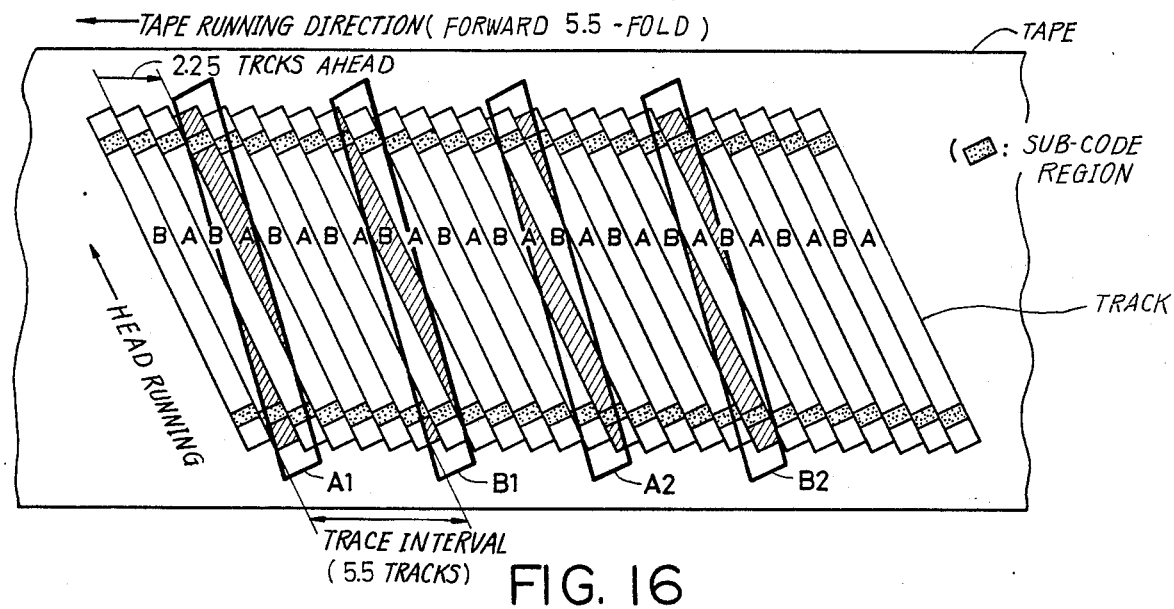

FIG. 16 shows a positional relation between the tape track and the head trace in the case of forward 5.5-fold speed. The head crosses the track to proceed to a position 2.25 tracks ahead in one trace. The respective head traces with an interval of 5.5-fold tracks are parallel with each other. The change in phase of the sections in which recorded information can be read and sections in which recorded information cannot be read in the case of FIG. 16 is shown in (c) of FIG. 14.

Figure 17:
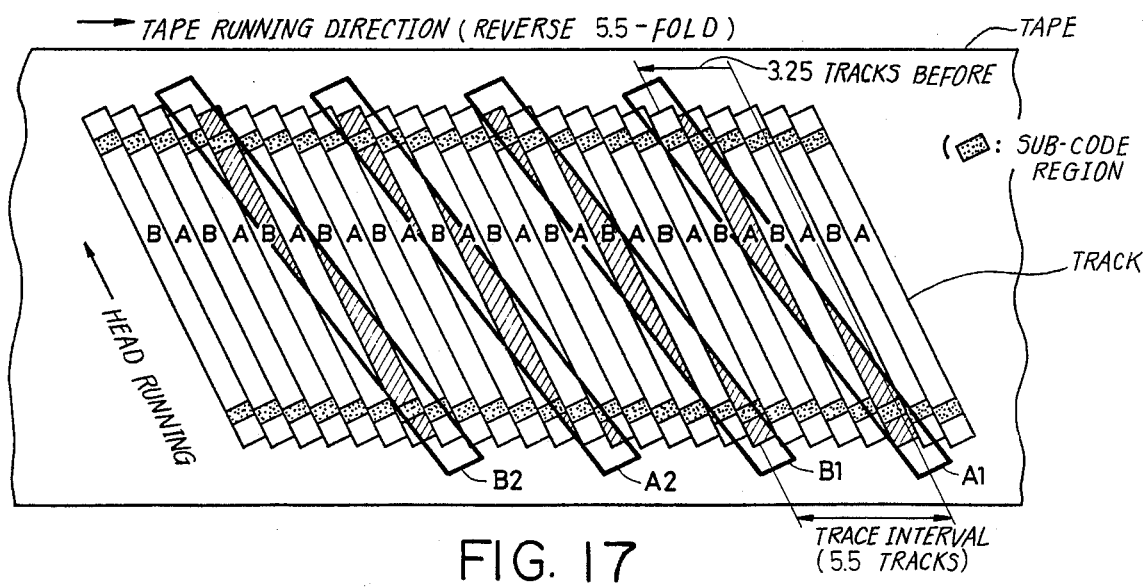

FIG. 17 shows a positional relation between the tape track and the head trace in the case of reverse 5.5-fold speed. The head crosses the track to return to a position 3.25 tracks before in one trace. The respective tracks with an interval of 5.5 tracks are parallel with each other. The change in phase of the sections in which recorded information can be read and sections in which recorded information cannot be read is shown in (d) of FIG. 14.

In the case of FIGS. 15-17, four among eight sub-code regions passed over by four traces can be substantially reproduced as in the case of FIG. 13 and a section in which sub-code cannot be read does not last more than two traces. A PCM reproduced signal can also be obtained in a stable manner.

The above description has been made with respect to the cases where the multiple speed is 4.5-fold speed and 5.5-fold speed. Similar effect can likewise be obtained in cases of 1.5-fold speed, 2.5-fold speed, 3.5-fold speed, 6.5-fold speed etc.

Figure 1A:
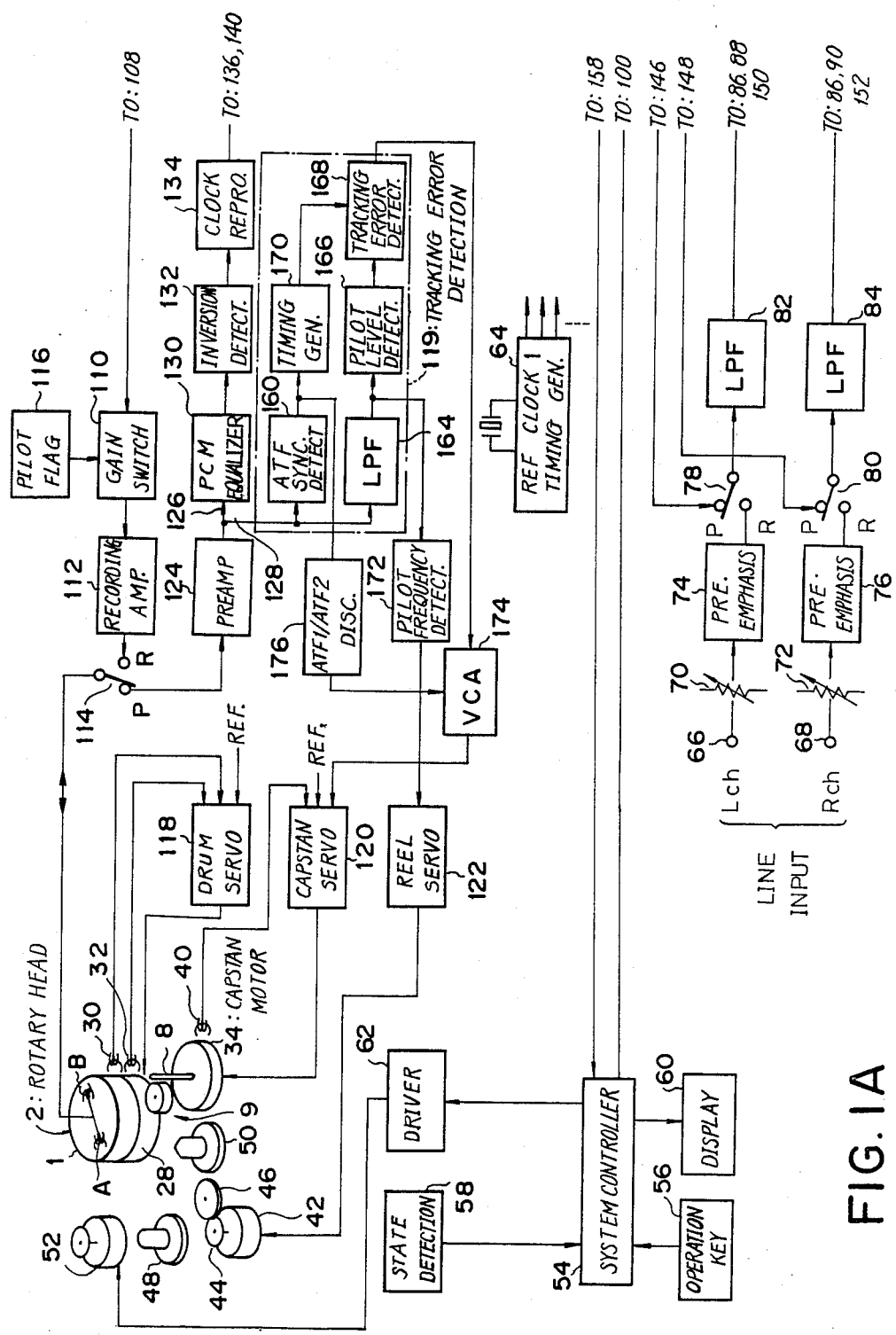
FIGS. 1A and 1B are block diagrams showing an embodiment in which this invention is applied to an R-DAT.
Figure 1B:
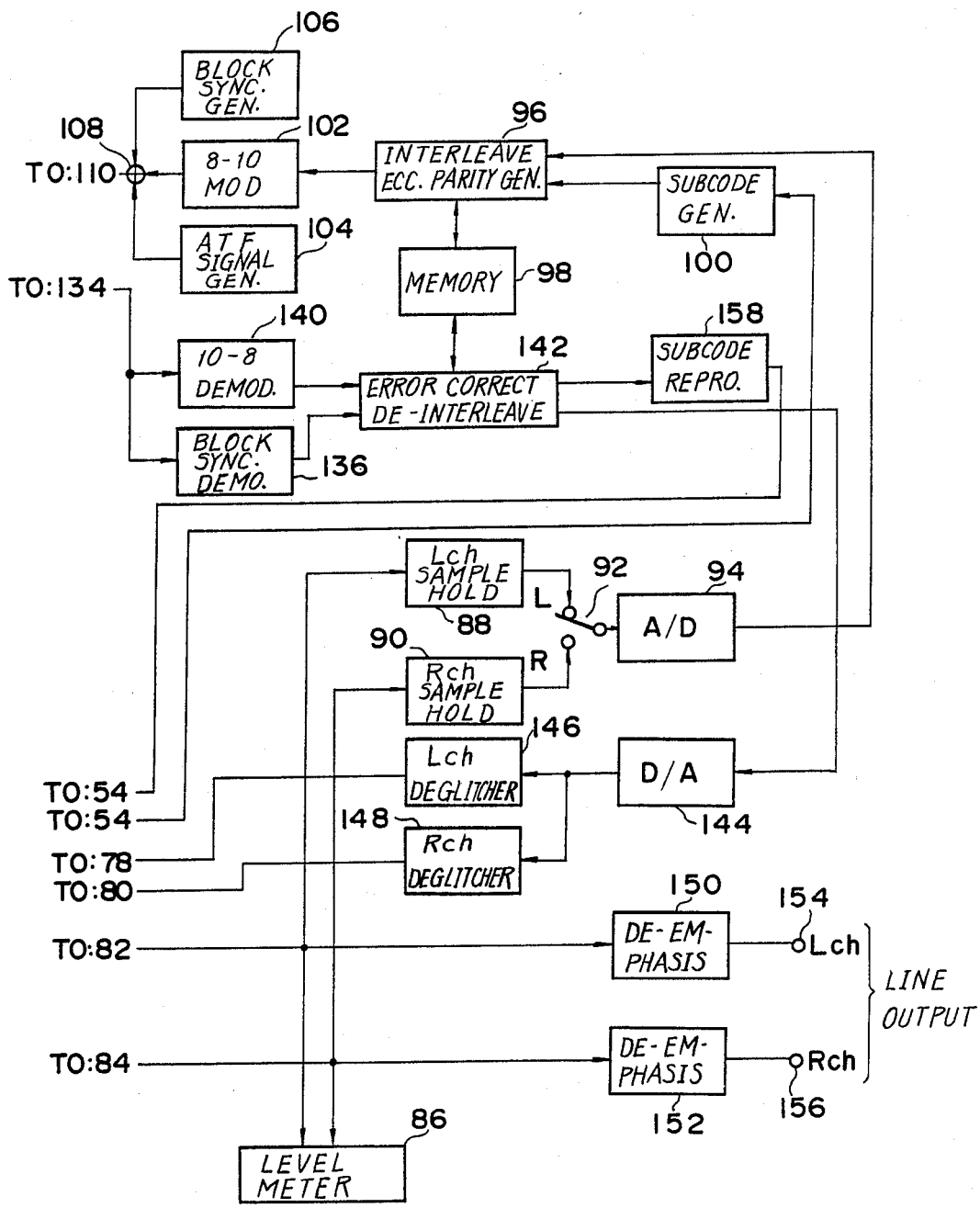
Figure 2:
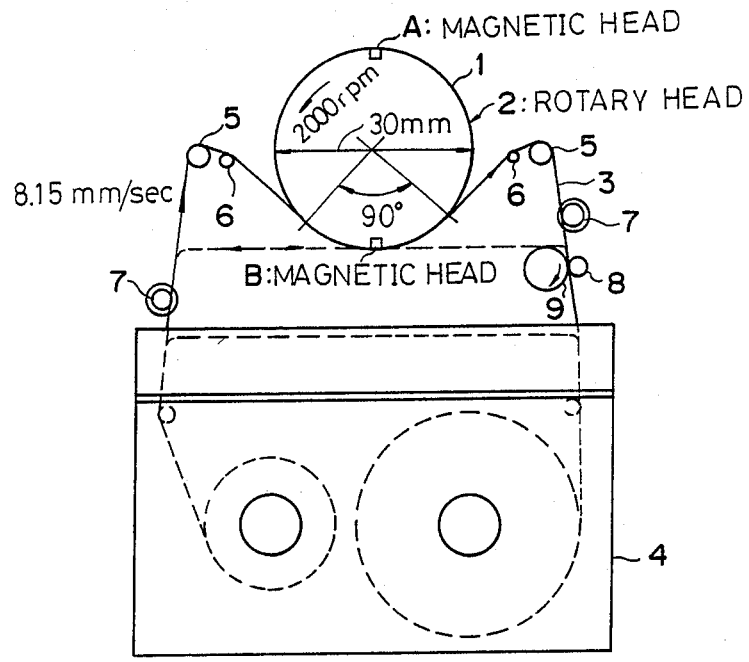
FIG. 2 is a view showing the mechanism of R-DAT.
Figure 3:
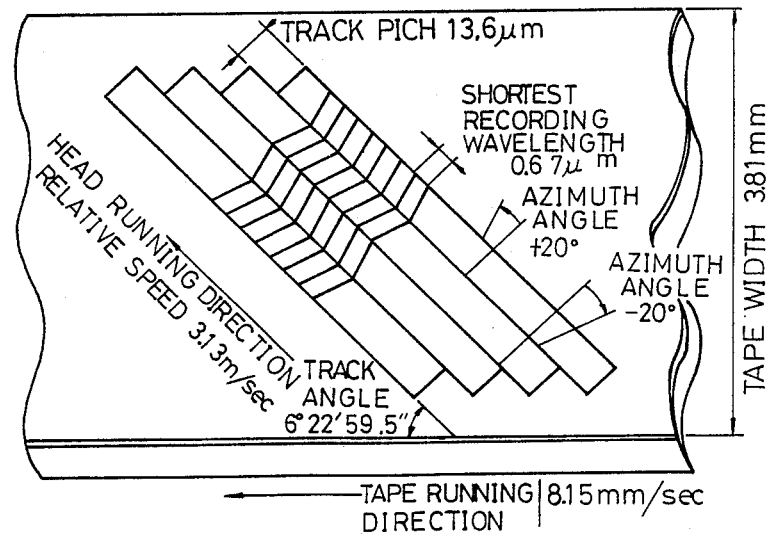
FIG. 3 is a tape format used for the R-DAT.

Next, an example of an R-DAT which performs the above described multiple speed reproduction will be described with reference to FIGS. 1A and 1B.

A system controller 54 comprises a microcomputer and controls operations at each section in accordance with contents of commands issued by a keyboard 56 or detection section 58 inside the system, displaying necessary items such as music number and time on a display 60.

A reference clock/timing generation circuit 64 generates various reference clocks and timing signals to be used in the signal processing system or servo processing system by quartz oscillation outputs.

A rotary head 2 has two magnetic heads A and B arranged on the circumferential surface of a cylinder 1 at an interval of 180°. The head 2 is driven by a drum motor 28. The head 2 is further provided with an FG (frequency generator) 30 for speed detection and a PG (phase generator) 32 for reference rotational position detection.

A capstan motor 34 comprises a motor shaft comprising a capstan 8, and a pinch roller 9 abuts on the capstan 8 to control and run the tape. An FG 40 is provided on the capstan motor 34 for speed detection.

A reel motor 42 drives reel tables 48 and 50 via pulleys 44 and 46 to wind the tape. A loading motor 52 loads cassettes and tapes, and is actuated by a command from the system controller 54 by a driver 62.

Description will now be made as to the operation of the sections used for recording.

Analog audio signals of right and left channels are applied from input terminals 66 and 68. These signals are adjusted in recording level by attenuators 70 and 72, pre-emphasized by pre-emphasis circuits 74 and 76 and supplied to switches 78 and 80.

The switches 78 and 80 are connected to the "R" side at the time of recording and supplies input analog signals to low-pass filters 82 and 84. The low-pass filters 82 and 84 are provided in order to attenuate unnecessary high frequency components in input signals and prevent aliasing due to sampling. They have cut-off frequency which is ca. one half of the sampling frequency. The low-pass filters 82 and 84 function as demodulating filters in the reproduction mode. A level meter 86 displays recording level and reproducing level.

The output analog signals from the low-pass filters 82 and 84 are applied to sample hold circuits 88 and 90 to be sampled therein with a predetermined sampling frequency (48 kHz at R-DAT mode I).

The sampling data from both channels are provided on a time shared basis by switching a switch 92 alternately, and converted into digital data (data of 16 bits for one channel) which forms the PCM data by an analog-to-digital converter 94.

The PCM data is divided into the upper order 8 bits and lower order 8 bits, and applied to an interleave/ECC parity generation circuit 96 for interleaving (rearrangement of data), parity generation (addition of error correction codes), addition of ID codes (identification codes), etc. via a memory 98. Sub-codes are prepared by a sub-code generation circuit 100 based on the data on the music number or time which are provided by the system controller 54.

The PCM data is applied to an 8-10 conversion circuit 102 which converts 8-bit data into 10-bit data respectively in a certain manner (i.e., in such a manner that the band is narrowed by restricting the interval of reversing magnetization and make DC current component zero).

Figure 4:
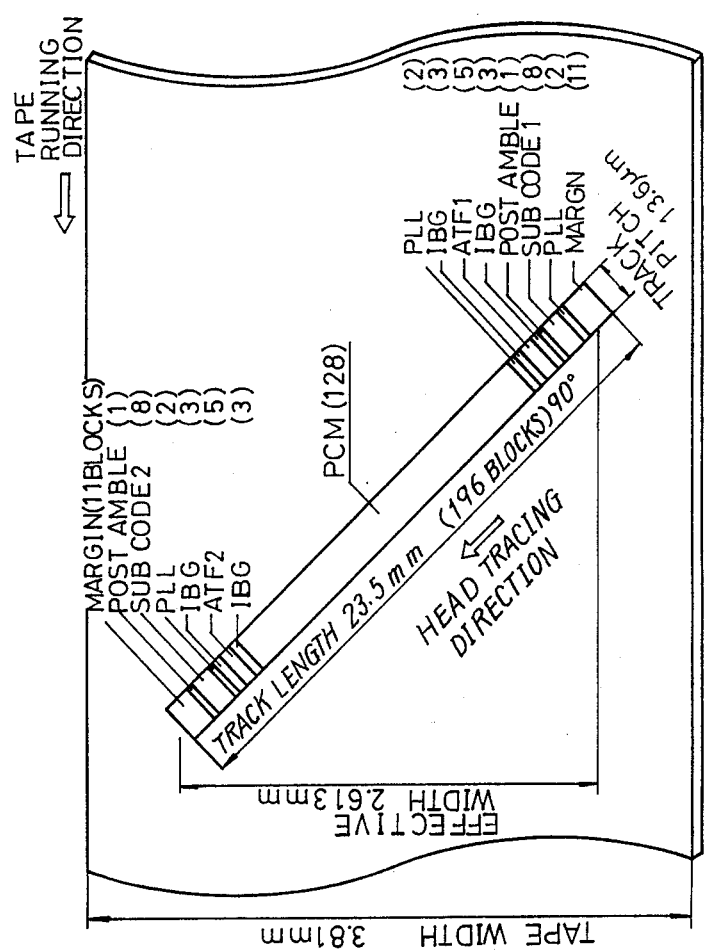
FIG. 4 is a track format of the R-DAT.
Figure 5:
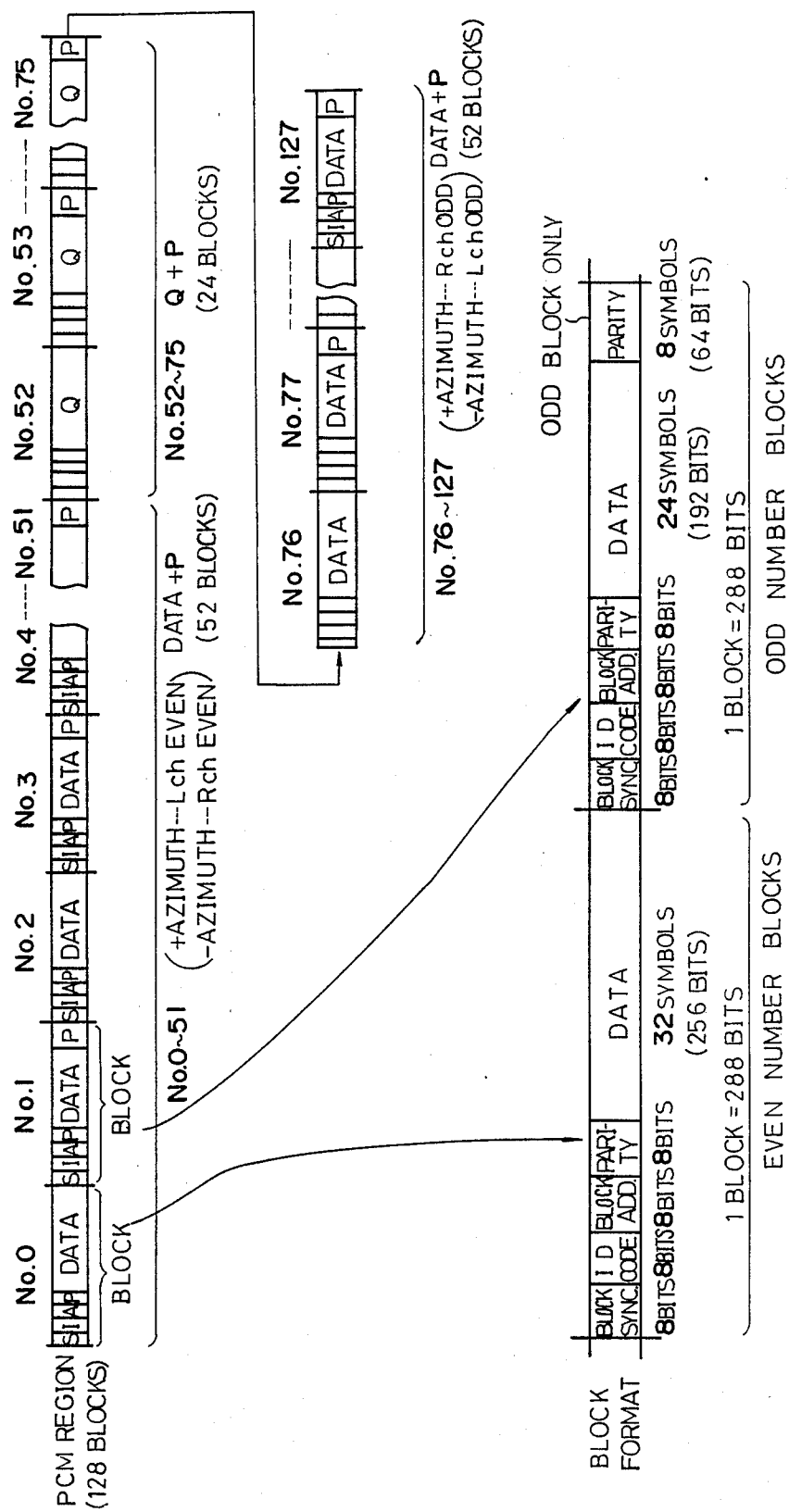
FIG. 5 is a format of PCM region shown in FIG. 4.
Figure 6:
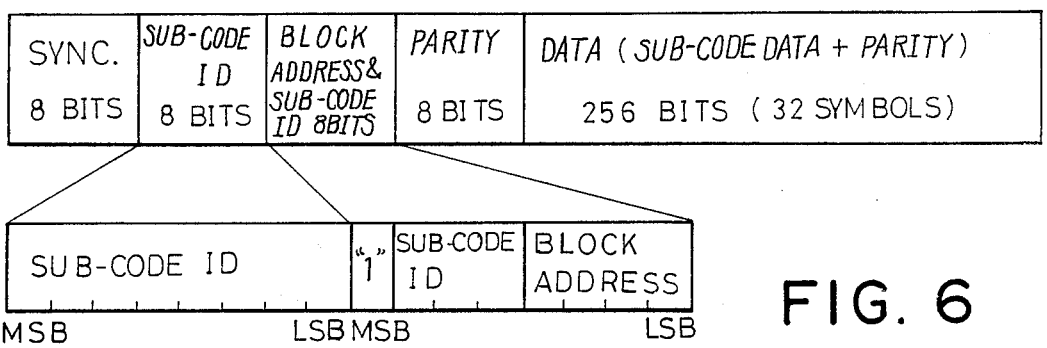
FIG. 6 is a block format of a sub-code region in FIG. 4.

A block synchronizing signal generation circuit 106 generates block synchronizing signals (refer to FIG. 5) which are placed at the beginning of a block respectively, a block being a basic unit of a track format. An ATF signal generation circuit 104 generates pilot signal f1, synchronizing signals f2 and f3, etc. which form respective patterns of ATF1 and ATF2. These signals are combined by a synthesizing circuit 108 in a suitable manner for the track format in FIG. 4. In this manner, a series of data which are to be recorded on a track are prepared.

These prepared series of data are applied to a switch 114 via a gain switch circuit 110 and a recording amplifier 112. The gain switch circuit 110 lowers the gain in accordance with a pilot flag from a circuit 116, which is raised during the period while the pilot signal f1 or ATF signal is being produced. Since the frequency of the pilot signal is low, if it is recorded with the same gain as other signals (or with the same recording current), this period alone is recorded excessively not to be easily erased when "over-write" occurs. The gain is therefore reduced to prevent such inconvenience during the period of the pilot signals to lower the recording current. The recording amplifier 112 amplifies the data to the level necessary to record it on the tape with the head 2. The switch 114 is connected to the "R" side at the recording, and feeds the output from the amplifier 112 to the heads A and B of the rotary head 2 to record the series of data on the tape.

A drum servo circuit 118 compares the rotation detection signals produced by FG 30 and PG 32 with the reference clock produced by the reference clock/timing generation circuit 64 in frequency and phase in the recording mode to control the rotation of the drum motor 28 to 2,000 rpm through PLL control. The drum servo circuit 118 controls the rotation phase of the rotary head 2 for setting the detection timing of the data fed to the heads A and B and that of the reference position detected by PG 32 at a predetermined timing so that the data for one track supplied from the amplifier 112 may be correctly recorded on one track on a tape with a format shown in FIG. 4.

The capstan servo circuit 120 controls the capstan motor 34 in PLL control to set the tape speed at a predetermined rate (8.15 mm/sec) by comparing the output from FG 40 with the reference clock in frequency and phase.

A reel servo 122 drives a reel motor 42 to optimally suspend the tape without sagging.

Description will now be given to the sections which are operated for reproduction.

All the switches 78, 80, and 114 are connected to the "P" side in the reproduction mode. The signals recorded on the tape are read by the heads A and B and applied to a preamplifier 124 via the switch 114. The output from the pre-amplifier 124 is fed to a PCM path 126 for reproducing PCM data and a controller path 128 for tracking control respectively.

The data fed in the PCM path 126 is compensated with respect to the frequency and phase characteristics of the heads A and B at a PCM equalizer 130 to open an eye pattern. The output from the PCM equalizer 130 is shaped in waveform into the digital signals of "1" and "0" by an inversion detecting circuit 132. Clock signal is also reproduced in a clock reproducing circuit 134.

The digital data which has been waveform-shaped is applied to a block synchronizing signal demodulation circuit 136 to be demodulated for identifying the beginning position of the data. It is also demodulated into the original data of the upper order 8 bits and the lower order 8 bits by a 10-8 demodulation circuit 140.

An error correction/de-interleave circuit 142 rearranges the reproduced data into the original pattern and corrects errors via a memory 98.

The corrected data now has 16 bits as the lower and upper 8 bits are combined. They are converted again to analog signals by a digital-to-analog converter 144. The analog signals are separated into the right and left channels and removed of unnecessary components by de-glitchers 146, 148. It is demodulated into the original audio signals by low-pass filters 82 and 84 via the switches 78 and 80, de-emphasized by de-emphasize circuits 150 and 152, and guided to output terminals 154 and 156 respectively.

The sub-codes reproduced at a sub-code reproduction circuit 158 are fed to the system controller 54 to be used for display the musical number or time on the display 60 or for searching.

By the operation of the drum servo circuit 118, the rotary head 2 is rotated at a predetermined rate in response to the reference clock in a manner similar to the recording mode.

The reproduced signals supplied to the control path 128 are applied to an ATF synchronizing signal detection circuit 160 to detect synchronizing signals f2 and f3 in the ATF signals. A low-pass filter 164 extracts the crosstalk components of the pilot signal f1 from the adjacent tracks within the ATF signal. A pilot level detection circuit 166 detects the level of the crosstalk components, and a tracking error detection circuit 168 calculates the difference between the levels of the crosstalk components with the timing signal generated from a timing generation circuit 170 based on the synchronizing signals f2 and f3 to detect tracking errors. The tracking error signals are fed to the capstan servo circuit 120 via a VCA 174. The capstan servo circuit 120 controls the revolution rate of the capstan motor 34 so as to reduce the tracking errors to zero.

The ATF1/ATF2 discrimination circuit 176 judges whether the detected ATF signal is ATF1 or ATF2 in order to switch gains. If ATF1 is detected, the circuit switches the gain to a higher gain G1 whereas if ATF2 is detected, it switches the gain to a lower gain G2. The ratio of the gain G1 against G2 is expressed as $$G1 : G2 = t2 : t1$$

wherein t1 is the time duration the error signals obtained at ATF1 is effective whereas t2 is the duration of time the error signals obtained at ATF2 is effective. In other words, the ratio of the gain is in inverse proportion to the ratio of time interval.

This equalizes the effects of tracking error signals obtained in ATF1 and ATF2 in the tracking servo. For further details, reference is made to the specification of Japanese Patent Application No. 309496/1986 of the same inventor as this application, and which patent was also applied in the U.S. Patent Office in December, 1987.

An ATF1/ATF2 discrimination circuit 176 may discriminate ATF1 from ATF2 by positional relation in respect of PCM. More particularly, as ATF1 is located before the PCM region in one track while ATF2 is located after the region, it can identify them positionally. Alternatively, if the output pulse from PG 32 can be obtained at the timing to start the track, the first ATF signal after the output pulse from PG 32 may be judged as ATF1 and the second may be judged as ATF2.

The pilot frequency detection circuit 172 is a circuit provided for fast searching (in fast searching, as different from multiple speed reproduction, the tape is fed by the reel motor 42 at a speed which is about 200 times as high as the normal reproduction. The rotation of the drum motor 28 is also controlled so as to control the relative speed to a predetermined value). The circuit 172 detects a pilot signal f1 among the ATF signals. In fast-searching, it is necessary to occasionally read start ID, music number or time data out of the recorded content on the tape in order to "fast forward" or "rewind" the tape at a target position. For the purpose, the relative speed between the heads A and B and the tape should be restricted at a value substantially same as that of recording. Pilot signal f1 is used for controlling the speed. In other words, as the pilot signal f1 is recorded in 130.67 kHz, it controls the reel servo circuit 122 to set the pilot signal f1 detected in the search at the frequency. This enables reading of start ID, music number and time data in sub-codes and feeding of the tape to the target position correctly.

During the multiple speed reproduction, the switches 78, 80 and 114 are connected to the "P" side in the same manner as in the normal reproduction mode. The capstan motor 34 is controlled to speeds which are 1.5-fold, 2.5-fold, 3.5-fold, 4.5-fold, 5.5-fold etc. of the speed in the normal reproduction mode in accordance with the multiple speed ratio. At this time, the drum motor 28 is fixed to 2,000 rpm as in the normal reproduction mode. The rotation speed of the reel motor, 42 is controlled in such a manner that take-up tension of the magnetic tape remains within a predetermined range. The positional relation between the traces of the heads A and B and the tape track become the one as shown in FIG. 13 or FIGS. 15–17 so that sub-code can be read without dropping over a long period of time as shown in FIG. 14 and reproduced by the sub-code reproduction circuit 158. The reproduced sub-code (music number, time data in the music etc.) is displayed by the display 60 through the system control 54 and is utilized for operations such as search.

The partially read PCM data is reproduced into an analog signal through the same processings as in the normal reproduction mode and provided out from the output terminals 154 and 156.

The position at which signals are reproduced can therefore be confirmed by both sound and visual display during multiple speed reproduction and the tape can be fed to a desired position.

The foregoing description has been made with respect to a case where the invention has been applied to an R-DAT. The invention however can be applied to other types of magnetic recording and reproducing device such as a video tape recorder which performs recording and reproduction by employing a rotary head having plural heads with different azimuths.

In the above described embodiment, a fraction to be added to multiple speed is accurately $\frac{1}{2}$. Similar effect will be obtained, however, even if a fraction to be added is a value which is somewhat deviated from $\frac{1}{2}$. A fraction to be added need not be a fixed value but may be a value which is finely fluctuated on time axis because deviation in the positional relation between the track and the head trace will be produced due to such fluctuation itself.

What is claimed is:

1. A magnetic recording and reproducing device, comprising:
    a rotary head incorporating plural heads having different azimuths for recording and reproducing an input signal by tracing a magnetic tape, the recorded magnetic tape including predetermined portions containing sub-code information separate from other information;
    processing means for separating the sub-code information from the other information during reproduction from the magnetic tape; and
    tape feeding drive means for feeding the magnetic tape during an increased speed reproduction with a substantially constant tape feeding speed within a range of about N + $\frac{1}{4}$ to about N + $\frac{3}{4}$ (where N is an integer not including zero) times a tape feeding speed during a normal speed reproduction, whereby sub-code information recorded in sub-code regions of the magnetic tape can be reproduced substantially in real-time.

2. A magnetic recording and reproducing device as defined in claim 1 wherein the tape feeding speed during the increased speed reproduction is substantially $(N+\frac{1}{2})$ (where N is an integer not including zero) times a tape feeding speed during a normal speed reproduction.

3. A system for recording and reproducing information on a magnetic tape, comprising:

a rotary head incorporating plural heads having different azimuths for recording and reproducing an input signal by tracing a magnetic tape, the recorded magnetic tape including predetermined portions containing sub-code information separate from other information, wherein sub-code information recorded on the magnetic tape represents at least one of a name of a musical piece, position, and time;

processing means for separating the sub-code information from the other information during reproduction from the magnetic tape; and tape feeding drive means for feeding the magnetic tape during an increased speed reproduction with a substantially constant tape feeding speed within a range of about $N+\frac{1}{4}$ to about $N+\frac{3}{4}$ (where N is an integer not including zero) times a tape feeding speed during a normal speed reproduction, whereby sub-code information recorded in sub-code regions of the magnetic tape can be reproduced substantially in real-time.

4. A method for recording and reproducing sub-code information in sub-code regions of a magnetic tape, comprising the steps of:

recording sub-code information in sub-code regions of the magnetic tape and other information in other regions of the magnetic tape by means of a rotary head; and feeding the tape during a higher speed reproduction at a substantially constant tape feeding speed within a range of about $N+\frac{1}{4}$ to about $N+\frac{3}{4}$ (where N is an integer not including zero) times a tape feeding speed during a normal speed reproduction; and reproducing the sub-code information separate from the other information.

* * * * *